United States Patent Office 3,014,208
Patented Dec. 19, 1961

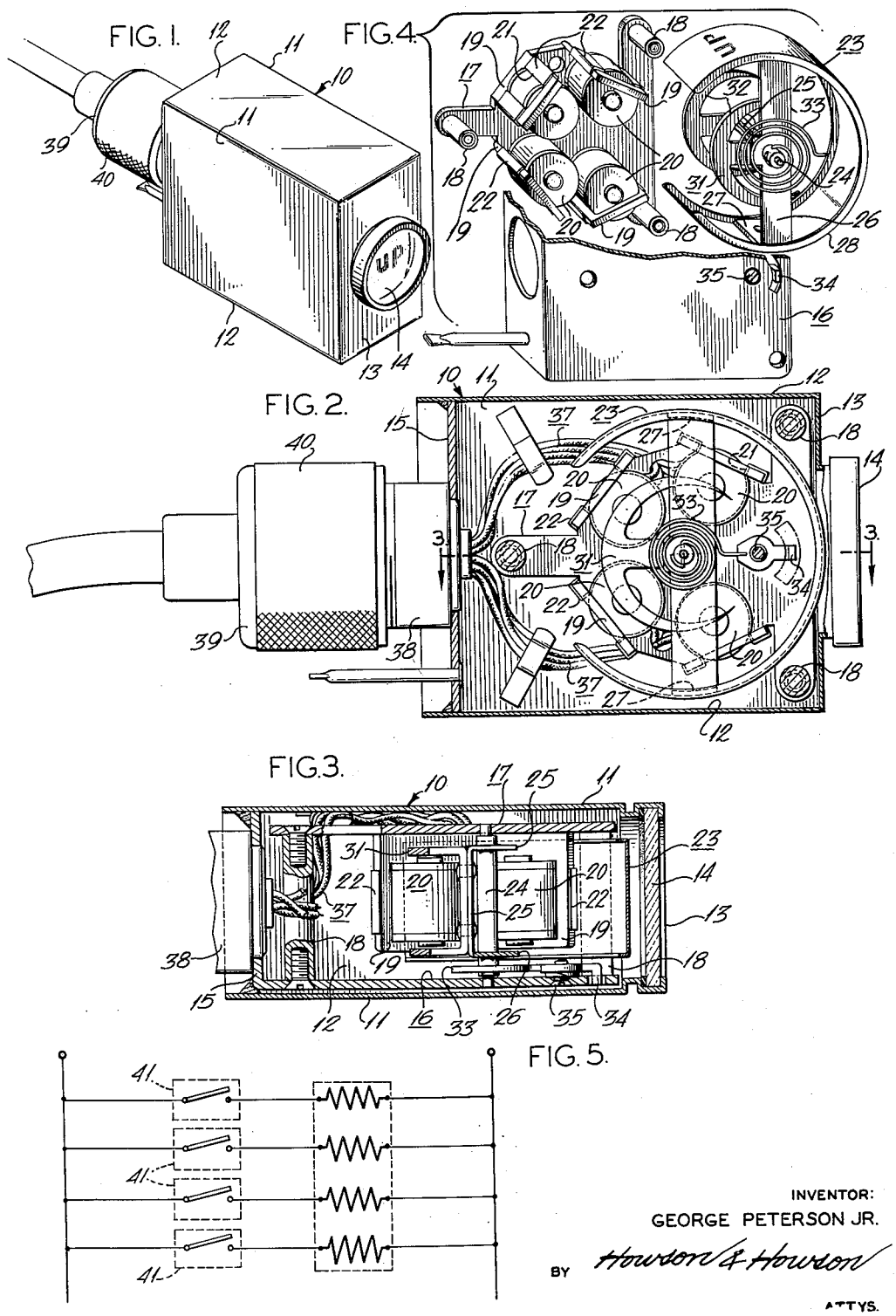

3,014,208
POSITION INDICATOR MECHANISM
George Peterson, Jr., 319 S. Wayne Ave., Wayne, Pa.
Filed Mar. 11, 1959, Ser. No. 798,699
2 Claims. (Cl. 340—319)

The present invention relates to new and useful improvements in position indicators for use, for example, in connection with aircraft to automatically indicate the position of a remote moveable element. More particularly, the present invention relates to structural improvements in an electro-magnetically actuated position indicator of this type wherein circuits remotely opened and closed will cause the position indicator to be actuated from a central neutral position to one of a series of other positions when one of a series of magnets circumferentially disposed about the armature of the indicator is energized to indicate the position of a remote moveable element.

A primary object of the present invention is to provide a novel position indicator operable to indicate the position of a remote moveable element.

Another object of the present invention is to provide an electro-magnetically operated position indicator having novel structural features whereby the position indicator may be assembled rapidly and easily maintained in the assembled position.

A further object of the present invention is to provide an electro-magnetically operated position indicator which is of relatively compact construction and may be economically manufactured and assembled from comparatively inexpensive fabricated parts and which will be sturdy and reliable when in use.

Still another object of the present invention is to provide a position indicator mechanism wherein a sensing apparatus will be actuated to various alternate positions pending energization of electro-magnets disposed circumferentially about the indicator.

These and other objects of the present invention and the various features and details of the operation and construction thereof are hereinafter more fully set forth and described with reference to the accompanying drawings, in which:

FIG. 1 is a perspective view of a position indicator made in accordance with the present invention;

FIG. 2 is a side elevational view partially in section of the position indicator of FIG. 1;

FIG. 3 is a sectional view taken along line 3—3, FIG. 2;

FIG. 4 is a perspective view of certain of the elements of the position indicator removed from the housing; and FIG. 5 is a schematic diagram of the electric circuit for the position indicator.

Referring more specifically to the drawings, reference numeral 10 designates a housing for the indicator which is generally rectangular and comprises opposite side walls 11, 11 top and bottom walls 12, 12 and a front wall 13. A glass or other transparent window member 14 is securely positioned in the center of the front wall 13 of the housing. The housing is completely enclosed and made air-tight by means of a generally rectangular rear wall 15 which is positioned in engagement with the inner edges of the side, top, and bottom walls of the housing and secured to the housing, for example, by means of a soldering.

Formed integrally with the rear wall 15 of the housing and projecting inwardly of the housing is a side frame member 16 formed as illustrated in FIG. 4 of the drawings. A second side frame member 17 is mounted in spaced parallel relation with the side frame member 16 interiorly of the housing 10, for example, by means of a plurality of tie-rods 18, 18 which are interconnected with the frame members 16 and 17 to thereby provide a structure for mounting the indicator and a plurality of electro-magnets. As illustrated in FIG. 2 of the present embodiment, the side frame member 17 has positioned about its periphery a plurality of extensions 19 which are formed integrally therewith and extending inwardly toward the frame member 16 to provide supports for mounting a plurality of electro-magnets 20. Each extension member 19, as shown, has a generally rectangular central opening 21 within which an electro-magnet 20 is secured. As seen in FIG. 4, the electro-magnets 20, being generally cylindrical in shape, are positioned within the rectangular openings 21 and are secured therein by means of a flexible band 22 which circumscribes the electro-magnet and is fastened to the opposite sides of the extension members.

As shown in the present embodiment, four electro-magnets 20 and a corresponding number of extension members 19 are provided. It will be understood, however, that any number of electro-magnets may be used, the number being determined solely by the number of positions of the moveable member to which the indicator is connected.

In accordance with the present invention, a rotor assembly 23 is pivotally mounted between the opposite side frame members 16 and 17 with its central axis generally at a point which would correspond to the center of a circle drawn through the cores of the electro-magnets. The rotor assembly comprises a shaft 24 extending between and pivotally mounted in the side frame members 16 and 17. Secured to the shaft 24 is a generally T-shaped support member which has a central leg 25 extending generally parallel to the shaft 24 and a cross piece 26 which extends perpendicularly outward from the central leg 25 on opposite sides thereof. The cross piece 26 terminates at its outer ends in support arms 27, 27 which are parallel to the shaft 24 and have secured thereto, as illustrated in FIGS. 2 and 4, an arcuate indicator plate 28. Also secured to the support member leg 25 and extending outwardly therefrom diametrically opposite the indicator plate 28 is an armature 31. The armature 31 includes a pair of spaced parallel crescent shaped arms 32, 32 which lie in parallel planes extending transversely to the axis of the shaft 24. The crescent shaped arms of the armature are formed of ferro-magnetic material, such as a soft steel and have their greatest mass at the central portion thereof which, in the present embodiment of the invention, is diametrically opposite the center of the indicator 28.

The rotor assembly and armature is pivotally mounted, by means of the shaft 24, between the side frame members with the center of the indicator 28 inwardly adjacent the housing window 14 and the armature arms overlying opposite sides of the electro-magnets 20. Centering means is provided to normally maintain the rotor in this central position. These means may comprise, for example, a coil type centering spring 33 adjacent one end of the shaft 24 having one end thereof secured to the shaft and the other end interconnected with a side frame member. Additionally, adjusting means may be provided to permit adjustment of this central position. These means may comprise a bracket 34 adjustably secured to the side frame, for example, by a bolt 35 as illustrated in FIGS. 2 and 3 so that by adjusting the position of the bracket 34 the central or neutral position of the indicator 28 relative to the window 14 may be adjusted.

According to the present invention, the indicator and armature assembly are mounted for movement from a central neutral position to various alternate limit positions. The indicator is normally maintained in its central or neutral position by means of the centering spring 33 and may be moved from this position upon the energization of any one of the electro-magnets 20. The electro-magnets are of the conventional type having a central core preferably of a soft iron and a coil which is wound about the central core. Thus, when an electric current is passed through the coil, a magnetic field is set up and a field is induced in the iron core center portion of the magnet. The crescent shaped armature having the bulk of its mass at the central portion will react to the field set up and rotate until the central portion of the armature overlies the core of the energized magnet.

The electro-magnets are electrically connected with an external source of power by means of electrically insulated conductors 37 which extend through an externally threaded nipple 38 carried by the housing rear wall. The conductors extend outwardly beyond the nipple 38 and are engaged within sockets of a conventional plug 39 maintained in contact with the conductors by means of a knurled nut 40 engaging the plug and threaded onto the nipple.

FIG. 5 illustrates a schematic wiring diagram of the position indicator of the present invention wherein the indicator may be moved from its central neutral position to various alternate positions. The circuit illustrated in FIG. 5 is designed to indicate, for example, the position of the ailerons of an aircraft and to this end, a plurality of switches 41 are provided which may be closed by a switch actuating member interconnected at some distant point with the aircraft ailerons. The number of switches 41 will correspond to the number of electro-magnets 20, which in turn will correspond to the number of positions of the moveable part to which the indicator is connected. Each switch 41 is interconnected to a separate electro-magnet 20 and is adapted to energize its associated electro-magnet when closed to thereby cause the indicator dial to move to a pre-selected position. The switches, in turn, are interconnected with a moveable member and are adapted to be closed selectively when the member is in a predetermined position.

From the foregoing it will be observed that the present invention provides a novel position indicator having novel structural features whereby the position indicator may be assembled rapidly and easily and maintained in the assembled position and in which the rotor assembly may be selectively directed to alternate positions by a corresponding selective energization of electro-magnets. In addition, it will be observed that the present invention provides a novel position indicator which is of relatively simple construction and may be manufactured and assembled easily and cheaply.

While a particular embodiment of the present invention has been illustrated and described herein it is not intended to limit the invention to such a disclosure and changes and modifications may be incorporated and embodied therein within the scope of the following claims.

I claim:

1. A multiple position indicator comprising a housing having spaced parallel side walls and a front wall provided with a window opening therein, a shaft extending crosswise within said housing between said side walls in inwardly-spaced relation from said window opening, means rotatably mounting said shaft within said housing, a support member secured to said shaft for rotation therewith, an arcuate indicator of a predetermined, uniform radius carried by said support member and arranged concentrically of said shaft in confronting relation to said window opening, means normally operable to predeterminedly position said indicator circumferentially of said shaft with the mid-portion of said indicator disposed in confronting relation to the window opening, a plurality of electro-magnets disposed concentrically of said shaft and lying within the confines of said arcuate indicator, each of said electro-magnets having a coil and a core extending axially of the coil in spaced parallel relation to the shaft, an armature secured to said support member oppositely of the shaft from the indicator and rotatable therewith, said armature having a pair of spaced parallel ferro-magnetic arm portions of arcuate shape concentric with said shaft and said indicator extending circumferentially of the shaft and disposed respectively outwardly adjacent and in confronting relation to the opposite ends of the cores of said plurality of electro-magnets, said arm portions having a radius of curvature less than the radius of said indicator and lying within the confines of said indicator, and each having their midpoint diametrically opposite said mid-portion of said indicator, the portions of each of the arms on opposite sides of the mid-point of the arms being of gradually diminishing width toward the ends thereof, and means to electrically energize said electro-magnets selectively to thereby actuate the armatures and position the mid-points of the arcuate arms thereof in endwise alignment with the core of the energized electro-magnet and correspondingly position the indicator relative to the window opening.

2. Apparatus in accordance with claim 1 wherein a frame member is provided supporting said electro-magnets concentrically of said shaft, said frame member having a plurality of support arms corresponding in number to the plurality of said electro-magnets extending in spaced parallel relation with said shaft and spaced radially outward of said arcuate arms, and means securing said electro-magnets to said support arms with said electro-magnets spaced radially inward of said support arms relative to said shaft between said arcuate arm portions of said armature with the opposite ends of the core thereof in confronting relation to said arcuate arms.

References Cited in the file of this patent

UNITED STATES PATENTS

| | | |
|---|---|---|
| 1,504,609 | Crane | Aug. 12, 1924 |
| 2,405,429 | Jewell | Aug. 6, 1946 |
| 2,633,566 | Oliwa | Mar. 31, 1953 |
| 2,728,064 | Savage | Dec. 20, 1955 |

UNITED STATES PATENT OFFICE
CERTIFICATION OF CORRECTION

Patent No. 3,014,208                  December 19, 1961

George Peterson, Jr.

It is hereby certified that error appears in the above numbered patent requiring correction and that the said Letters Patent should read as corrected below.

Column 4, line 47, for "positions" read -- portions --.

Signed and sealed this 24th day of April 1962.

(SEAL)
Attest:

ESTON G. JOHNSON
Attesting Officer

DAVID L. LADD
Commissioner of Patents